United States Patent
Malik

(10) Patent No.: US 9,247,228 B2
(45) Date of Patent: *Jan. 26, 2016

(54) APPARATUS AND METHOD FOR PROVIDING MEDIA CONTENT

(71) Applicant: AT&T Intellectual Property I, LP, Atlanta, GA (US)

(72) Inventor: Dale Malik, Atlanta, GA (US)

(73) Assignee: AT&T INTELLECTUAL PROPERTY I, LP, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/618,260

(22) Filed: Feb. 10, 2015

(65) Prior Publication Data
US 2015/0163472 A1 Jun. 11, 2015

Related U.S. Application Data

(63) Continuation of application No. 12/848,742, filed on Aug. 2, 2010, now Pat. No. 8,994,716.

(51) Int. Cl.
*G06T 15/00* (2011.01)
*H04N 13/00* (2006.01)
*H04N 13/04* (2006.01)

(52) U.S. Cl.
CPC ....... *H04N 13/0011* (2013.01); *H04N 13/0022* (2013.01); *H04N 13/0066* (2013.01); *H04N 13/0434* (2013.01); *H04N 13/0438* (2013.01)

(58) Field of Classification Search
None
See application file for complete search history.

(56) References Cited

U.S. PATENT DOCUMENTS

| | | | |
|---|---|---|---|
| 2,832,821 | A | 4/1958 | Du Mont |
| 4,649,425 | A | 3/1987 | Pund |
| 5,012,351 | A | 4/1991 | Isono |
| 5,293,529 | A | 3/1994 | Yoshimura et al. |
| 5,353,269 | A | 10/1994 | Kobayashi et al. |
| 5,392,266 | A | 2/1995 | Kobayashi et al. |
| 5,465,175 | A | 11/1995 | Woodgate |
| 6,014,164 | A | 1/2000 | Woodgate |
| 6,115,177 | A | 9/2000 | Vossler |
| 6,144,375 | A | 11/2000 | Jain et al. |
| 6,188,442 | B1 | 2/2001 | Narayanaswami |
| 6,243,054 | B1 | 6/2001 | DeLuca |
| 6,285,368 | B1 | 9/2001 | Sudo |

(Continued)

OTHER PUBLICATIONS

Edwards, "Active Shutter 3D Technology for HDTV", PhysOrg.com; 12 pages; Sep. 25, 2009; http://www.physorg.com/news173082582.html; web site last visited May 10, 2010.

*Primary Examiner* — Andrew G Yang
(74) *Attorney, Agent, or Firm* — Guntin & Gust, PLC; Joseph Hrutka

(57) ABSTRACT

A system that incorporates teachings of the present disclosure may include, for example, a set top box having a controller to receive two-dimensional image content comprising a plurality of images, identify an object in a first image of the plurality of images, identify the object in a second image of the plurality of images, determine a perspective angle difference between the first and second images, generate a third image using the first and second images when the perspective angle difference satisfies a three-dimensional angle threshold, generate three-dimensional image content using the first image and the third image, and provide the three-dimensional image content to a display device operably coupled with the set top box. Other embodiments are disclosed.

20 Claims, 7 Drawing Sheets

(56) References Cited

U.S. PATENT DOCUMENTS

| | | |
|---|---|---|
| 6,535,241 B1 | 3/2003 | McDowall |
| 6,559,813 B1 | 5/2003 | DeLuca |
| 6,654,721 B2 | 11/2003 | Handelman |
| 6,725,463 B1 | 4/2004 | Birleson |
| 6,859,549 B1 | 2/2005 | Oliensis |
| 6,924,833 B1 | 8/2005 | McDowall |
| 6,965,381 B2 | 11/2005 | Kitamura |
| 7,106,358 B2 | 9/2006 | Valliath et al. |
| 7,204,592 B2 | 4/2007 | O'Donnell |
| 7,245,430 B2 | 7/2007 | Kobayashi et al. |
| 7,391,443 B2 | 6/2008 | Kojima et al. |
| 7,613,927 B2 | 11/2009 | Holovacs |
| 7,785,201 B2 | 8/2010 | Hashimoto |
| 7,813,543 B2 | 10/2010 | Modén |
| 8,111,282 B2 | 2/2012 | Cutler et al. |
| 8,117,281 B2 | 2/2012 | Robinson et al. |
| 8,254,668 B2 | 8/2012 | Mashitani |
| 8,305,914 B2 | 11/2012 | Thielman et al. |
| 8,370,873 B2 | 2/2013 | Shintani |
| 8,416,278 B2 | 4/2013 | Kim et al. |
| 8,436,888 B1 | 5/2013 | Baldino et al. |
| 8,456,507 B1 | 6/2013 | Mallappa et al. |
| 8,552,983 B2 | 10/2013 | Chiu |
| 8,675,067 B2 | 3/2014 | Chou et al. |
| 2002/0009137 A1 | 1/2002 | Nelson |
| 2002/0122145 A1 | 9/2002 | Tung |
| 2002/0122585 A1 | 9/2002 | Swift et al. |
| 2003/0043262 A1 | 3/2003 | Takemoto |
| 2003/0128273 A1 | 7/2003 | Matsui |
| 2003/0132951 A1 | 7/2003 | Sorokin et al. |
| 2003/0214630 A1 | 11/2003 | Winterbotham |
| 2003/0223499 A1 | 12/2003 | Routhier |
| 2003/0231179 A1 | 12/2003 | Suzuki |
| 2004/0027452 A1 | 2/2004 | Yun |
| 2004/0104864 A1 | 6/2004 | Nakada |
| 2004/0109093 A1 | 6/2004 | Small-Stryker |
| 2004/0218104 A1 | 11/2004 | Smith |
| 2005/0041736 A1 | 2/2005 | Butler-Smith et al. |
| 2005/0066165 A1 | 3/2005 | Peled et al. |
| 2005/0084006 A1 | 4/2005 | Lei |
| 2005/0123171 A1 | 6/2005 | Kobayashi et al. |
| 2005/0169553 A1 | 8/2005 | Maurer |
| 2005/0185711 A1 | 8/2005 | Pfister |
| 2005/0190180 A1 | 9/2005 | Jin et al. |
| 2005/0270367 A1 | 12/2005 | McDowall |
| 2006/0046846 A1 | 3/2006 | Hashimoto |
| 2006/0109200 A1 | 5/2006 | Alden |
| 2006/0161410 A1 | 7/2006 | Hamatani et al. |
| 2006/0203085 A1 | 9/2006 | Tomita |
| 2006/0252978 A1 | 11/2006 | Vesely |
| 2006/0274197 A1 | 12/2006 | Yoo |
| 2007/0039032 A1 | 2/2007 | Goldey et al. |
| 2007/0052672 A1 | 3/2007 | Ritter et al. |
| 2007/0153122 A1 | 7/2007 | Ayite |
| 2007/0171275 A1 | 7/2007 | Kenoyer |
| 2007/0242068 A1 | 10/2007 | Han |
| 2007/0263003 A1 | 11/2007 | Ko |
| 2007/0266412 A1 | 11/2007 | Trowbridge |
| 2007/0296721 A1 | 12/2007 | Chang et al. |
| 2008/0015997 A1 | 1/2008 | Moroney et al. |
| 2008/0024454 A1 | 1/2008 | Everest |
| 2008/0044079 A1 | 2/2008 | Chao et al. |
| 2008/0062125 A1 | 3/2008 | Kitaura |
| 2008/0080852 A1 | 4/2008 | Chen |
| 2008/0100547 A1 | 5/2008 | Cernasov |
| 2008/0151092 A1 | 6/2008 | Vilcovsky et al. |
| 2008/0199070 A1 | 8/2008 | Kim et al. |
| 2008/0247610 A1 | 10/2008 | Tsunoda |
| 2008/0247670 A1 | 10/2008 | Tam et al. |
| 2008/0256572 A1 | 10/2008 | Chen |
| 2008/0303896 A1 | 12/2008 | Lipton |
| 2008/0310499 A1 | 12/2008 | Kim |
| 2009/0033737 A1 | 2/2009 | Goose et al. |
| 2009/0046895 A1 | 2/2009 | Pettersson et al. |
| 2009/0096858 A1 | 4/2009 | Jeong et al. |
| 2009/0100474 A1 | 4/2009 | Migos |
| 2009/0122134 A1 | 5/2009 | Joung et al. |
| 2009/0128620 A1 | 5/2009 | Lipton |
| 2009/0160934 A1 | 6/2009 | Hendrickson et al. |
| 2009/0174708 A1 | 7/2009 | Yoda et al. |
| 2009/0278917 A1 | 11/2009 | Dobbins et al. |
| 2009/0310851 A1 | 12/2009 | Arcas et al. |
| 2009/0315977 A1 | 12/2009 | Jung |
| 2009/0319178 A1 | 12/2009 | Khosravy |
| 2010/0007582 A1 | 1/2010 | Zalewski |
| 2010/0013738 A1 | 1/2010 | Covannon |
| 2010/0026783 A1 | 2/2010 | Chiu et al. |
| 2010/0039428 A1 | 2/2010 | Kim et al. |
| 2010/0045772 A1 | 2/2010 | Roo et al. |
| 2010/0045779 A1 | 2/2010 | Kwon |
| 2010/0066816 A1 | 3/2010 | Kane |
| 2010/0073468 A1 | 3/2010 | Kutner |
| 2010/0076642 A1 | 3/2010 | Hoffberg |
| 2010/0079585 A1 | 4/2010 | Nemeth |
| 2010/0085424 A1 | 4/2010 | Kane et al. |
| 2010/0086200 A1 | 4/2010 | Stankiewicz et al. |
| 2010/0098299 A1 | 4/2010 | Muquit et al. |
| 2010/0103106 A1 | 4/2010 | Chui |
| 2010/0114783 A1 | 5/2010 | Spolar |
| 2010/0134411 A1 | 6/2010 | Tsumura |
| 2010/0150523 A1 | 6/2010 | Okubo |
| 2010/0171697 A1 | 7/2010 | Son et al. |
| 2010/0177161 A1 | 7/2010 | Curtis |
| 2010/0177172 A1 | 7/2010 | Ko |
| 2010/0182404 A1 | 7/2010 | Kuno |
| 2010/0188488 A1 | 7/2010 | Birnbaum et al. |
| 2010/0188511 A1 | 7/2010 | Matsumoto |
| 2010/0192181 A1 | 7/2010 | Friedman |
| 2010/0194857 A1 | 8/2010 | Mentz |
| 2010/0199341 A1 | 8/2010 | Foti et al. |
| 2010/0201790 A1 | 8/2010 | Son |
| 2010/0215251 A1 | 8/2010 | Klein Gunnewiek et al. |
| 2010/0225576 A1 | 9/2010 | Morad |
| 2010/0225735 A1 | 9/2010 | Shaffer et al. |
| 2010/0226288 A1 | 9/2010 | Scott et al. |
| 2010/0235871 A1 | 9/2010 | Kossin |
| 2010/0303442 A1 | 12/2010 | Newton et al. |
| 2010/0306800 A1 | 12/2010 | Jung et al. |
| 2010/0309287 A1 | 12/2010 | Rodriguez |
| 2010/0315494 A1 | 12/2010 | Ha et al. |
| 2011/0001806 A1 | 1/2011 | Nakahata |
| 2011/0012896 A1 | 1/2011 | Ji |
| 2011/0012992 A1 | 1/2011 | Luthra |
| 2011/0029893 A1 | 2/2011 | Roberts et al. |
| 2011/0032328 A1 | 2/2011 | Raveendran |
| 2011/0037837 A1 | 2/2011 | Chiba et al. |
| 2011/0043614 A1 | 2/2011 | Kitazato |
| 2011/0050860 A1 | 3/2011 | Watson |
| 2011/0050866 A1 | 3/2011 | Yoo |
| 2011/0050869 A1 | 3/2011 | Gotoh |
| 2011/0078737 A1 | 3/2011 | Kanemaru |
| 2011/0096155 A1 | 4/2011 | Choo |
| 2011/0109715 A1 | 5/2011 | Jing et al. |
| 2011/0119640 A1 | 5/2011 | Berkes |
| 2011/0119709 A1 | 5/2011 | Kim et al. |
| 2011/0122152 A1 | 5/2011 | Glynn et al. |
| 2011/0128354 A1 | 6/2011 | Tien et al. |
| 2011/0138334 A1 | 6/2011 | Jung |
| 2011/0157329 A1 | 6/2011 | Huang et al. |
| 2011/0164110 A1 | 7/2011 | Fortin et al. |
| 2011/0164122 A1 | 7/2011 | Hardacker |
| 2011/0193946 A1 | 8/2011 | Apitz |
| 2011/0199460 A1 | 8/2011 | Gallagher |
| 2011/0199469 A1 | 8/2011 | Gallagher |
| 2011/0211049 A1 | 9/2011 | Bassali et al. |
| 2011/0221874 A1 | 9/2011 | Oh |
| 2011/0225611 A1 | 9/2011 | Shintani |
| 2011/0228040 A1 | 9/2011 | Blanche et al. |
| 2011/0254921 A1 | 10/2011 | Pahalawatta |
| 2011/0255003 A1 | 10/2011 | Pontual |
| 2011/0258665 A1 | 10/2011 | Fahrny et al. |
| 2011/0267437 A1 | 11/2011 | Abeloe |
| 2011/0267439 A1 | 11/2011 | Chen |
| 2011/0271304 A1 | 11/2011 | Loretan |

(56) References Cited

U.S. PATENT DOCUMENTS

| | | |
|---|---|---|
| 2011/0285828 A1 | 11/2011 | Bittner |
| 2011/0286720 A1 | 11/2011 | Obana et al. |
| 2011/0298803 A1 | 12/2011 | King et al. |
| 2011/0301760 A1 | 12/2011 | Shuster et al. |
| 2011/0304613 A1 | 12/2011 | Thoresson |
| 2011/0310234 A1 | 12/2011 | Sarma |
| 2012/0007948 A1 | 1/2012 | Suh et al. |
| 2012/0026396 A1 | 2/2012 | Banavara |
| 2012/0033048 A1 | 2/2012 | Ogawa |
| 2012/0050507 A1 | 3/2012 | Keys |
| 2012/0092445 A1 | 4/2012 | McDowell et al. |
| 2012/0169730 A1 | 7/2012 | Inoue |
| 2012/0169838 A1 | 7/2012 | Sekine |
| 2012/0206558 A1 | 8/2012 | Setton et al. |
| 2012/0249719 A1 | 10/2012 | Lemmey et al. |
| 2012/0274731 A1 | 11/2012 | Shanmukhadas et al. |
| 2012/0327174 A1 | 12/2012 | Hines et al. |

Polarized Display

600

700

800

APPARATUS AND METHOD FOR PROVIDING MEDIA CONTENT

CROSS-REFERENCE TO RELATED APPLICATION(S)

This application is a continuation of U.S. patent application Ser. No. 12/848,742 filed Aug. 2, 2010 by Malik, entitled "Apparatus and Method for Providing Media Content" and published as U.S. Patent Publication No. 2012/0030727 on Feb. 2, 2012. All sections of the aforementioned application are incorporated herein by reference in its entirety.

FIELD OF THE DISCLOSURE

The present disclosure relates generally to media content communication and more specifically to an apparatus and method for providing media content.

BACKGROUND

Media consumption has become a multibillion dollar industry that continues to grow rapidly. High resolution displays are being introduced into the marketplace that can now present two-dimensional movies and games with three-dimensional perspective with clarity never seen before. However, existing media is often generated to be presented in only two-dimensions.

DETAILED DESCRIPTION

One embodiment of the present disclosure can entail a set top box having a controller to receive two-dimensional image content comprising a plurality of images and to identify an object in a first image of the plurality of images. The controller can identify the object in a second image of the plurality of images, determine a perspective angle difference between the first and second images, and generate a third image using the first and second images when the perspective angle difference satisfies a three-dimensional angle threshold. The controller can generate three-dimensional image content using the first image and the third image, and can provide the three-dimensional image content to a display device operably coupled with the set top box.

One embodiment of the present disclosure can entail a non-transitory computer-readable storage medium operating in a media processor, where the storage medium includes computer instructions to receive two-dimensional image content comprising a plurality of images. The computer instructions can generate three-dimensional image content using first and second images of the plurality of images, and can adjust a depth perspective of the three-dimensional image content. The computer instructions can provide the three-dimensional image content having the adjusted depth perspective to a display device operably coupled with the media processor.

One embodiment of the present disclosure can entail a method comprising receiving two-dimensional image content comprising a plurality of images and determining a perspective difference between a first image and a second image of the plurality of images. The method can also include generating three-dimensional image content using the first and second images when the perspective difference satisfies a three-dimensional perspective threshold, and providing the three-dimensional image content to a display device operably coupled to one of a set top box and a gaming console.

Figure 1:
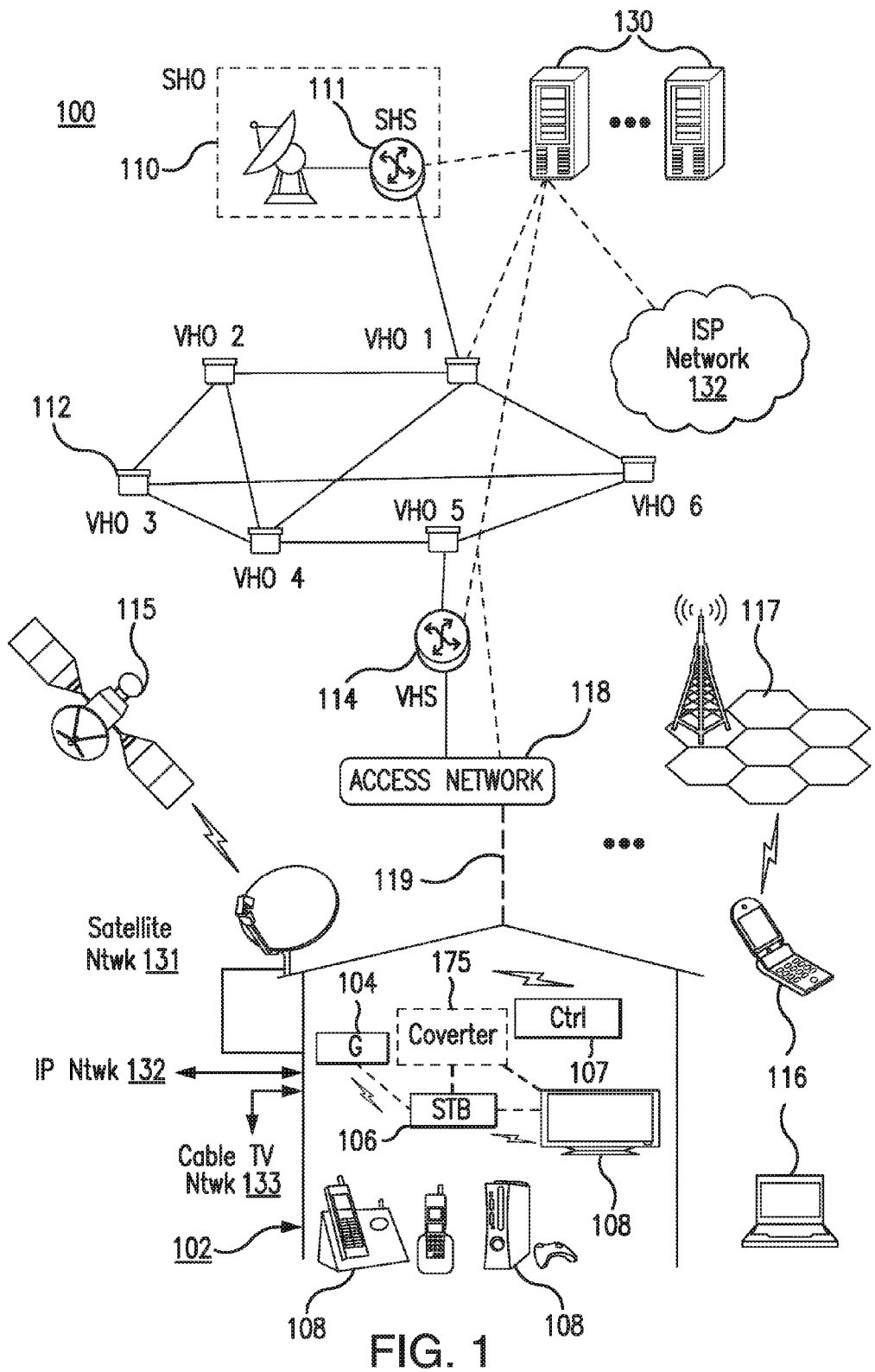
FIGS. 1 and 7 depict illustrative embodiments of communication systems that provide media services.

FIG. 1 depicts an illustrative embodiment of a first communication system 100 for delivering media content. The communication system 100 can represent an Internet Protocol Television (IPTV) broadcast media system although other media broadcast systems are contemplated by the present disclosures. The IPTV media system can include a super head-end office (SHO) 110 with at least one super headend office server (SHS) 111 which receives media content from satellite and/or terrestrial communication systems. In the present context, media content can represent audio content, moving image content such as videos, still image content, or combinations thereof. The SHS server 111 can forward packets associated with the media content to video head-end servers (VHS) 114 via a network of video head-end offices (VHO) 112 according to a common multicast communication protocol.

The VHS 114 can distribute multimedia broadcast programs via an access network 118 to commercial and/or residential buildings 102 housing a gateway 104 (such as a residential or commercial gateway). The access network 118 can represent a group of digital subscriber line access multiplexers (DSLAMs) located in a central office or a service area interface that provides broadband services over optical links or copper twisted pairs 119 to buildings 102. The gateway 104 can use common communication technology to distribute broadcast signals to media processors 106 such as Set-Top Boxes (STBs) or gaming consoles, which in turn present broadcast channels to media devices 108 such as computers, television sets, managed in some instances by a media controller 107 (such as an infrared or RF remote control, gaming controller, etc.).

The gateway 104, the media processors 106, and media devices 108 can utilize tethered interface technologies (such as coaxial, phone line, or powerline wiring) or can operate over a common wireless access protocol such as Wireless Fidelity (WiFi). With these interfaces, unicast communications can be invoked between the media processors 106 and subsystems of the IPTV media system for services such as video-on-demand (VoD), browsing an electronic programming guide (EPG), or other infrastructure services.

Some of the network elements of the IPTV media system can be coupled to one or more computing devices 130. All or a portion of the computing devices 130 can operate as a web server for providing portal services over an Internet Service Provider (ISP) network 132 to wireline media devices 108 or wireless communication devices 116 (e.g., cellular phone, laptop computer, etc.) by way of a wireless access base station 117 operating according to common wireless access protocols, such as WiFi, or cellular communication technologies (such as GSM, CDMA, UMTS, WiMAX, Software Defined Radio or SDR, and so on).

A satellite television system can be used in addition to, or in place of, the IPTV media system. In this embodiment, signals transmitted by a satellite 115 carrying media content can be intercepted by a common satellite dish receiver 131 coupled to the building 102. Modulated signals intercepted by the satellite dish receiver 131 can be transferred to the media processors 106 for decoding and distributing channels to the media devices 108. The media processors 106 can be equipped with a broadband port to the IP network 132 to enable services such as VoD and EPG described above.

In yet another embodiment, an analog or digital broadcast distribution system such as cable TV system 133 can be used in place of, or in addition to, the IPTV media system described above. In this embodiment, the cable TV system 133 can provide Internet, telephony, and interactive media services.

It is contemplated that the present disclosure can apply to any present or next generation over-the-air and/or landline media content services system. In one embodiment, an IP Multimedia Subsystem (IMS) network architecture can be utilized to facilitate the combined services of circuit-switched and packet-switched systems in delivering the media content to one or more viewers.

A converter 175 can be used for converting or otherwise adjusting between two-dimensional image content and three-dimensional image content. In one embodiment, the generation of three-dimensional content is based only on the images provided in the two-dimensional content and does not require use of any other imaging data, such as metadata. For instance, the converter 175 can identify a first object in a first image that is to be provided with depth. The identification can be performed without user intervention. However, the present disclosure also contemplates user intervention in the identification of the objects, such as a user selecting types of objects that are to be provided with depth (such as a main character in a movie) including through the use of pre-selections made by the user. Once the first object is identified, then the other images from the content can be analyzed to detect the presence of the same object.

After detecting the presence of the object in a second image, a perspective or depth determination can be made for the second image by the converter 175. For example, the camera angle for the second image can be determined. If the perspective or depth determination satisfies a threshold then the second image can be utilized in generating three-dimensional content. As one example, a third image comprising the object can be generated such that the third image provides a satisfactory difference in viewing angle thereby providing a three-dimensional view. The third image and the first image can then be used with alternate-frame sequencing or polarization for presenting the three-dimensional content. In another embodiment, the third image can be superimposed onto the first image. Other techniques for generating the three-dimensional content are also contemplated including anaglyphics, active shuttering, autostereoscopy, and so forth.

The received two-dimensional image content can be in various forms, including still images, moving images and video games. The converter 175 can be a separate device that is configured for wired and/or wireless communication with media presentation devices and/or media processors, including set top boxes, televisions and so forth. The converter 175 can also be incorporated into the media presentation devices and/or media processors, including the set top boxes and televisions. In one embodiment, the converter 175 can receive a broadcast of two-dimensional image content and can adjust the two-dimensional image content into three-dimensional image content without the need for additional information (such as a depth map or metadata) being provided with the content.

The converter 175 is capable of identifying the same object in a plurality of different images and then utilizing those images to generate three-dimensional content. The converter 175 can calculate a perspective angle for each of the images and utilize that perspective angle to determine whether the particular image can be used for generating the three-dimensional content associated with the particular object in the images. In one embodiment, a perspective threshold can be adjustable so as to improve the viewing experience of each of the user's individually.

Figure 2:
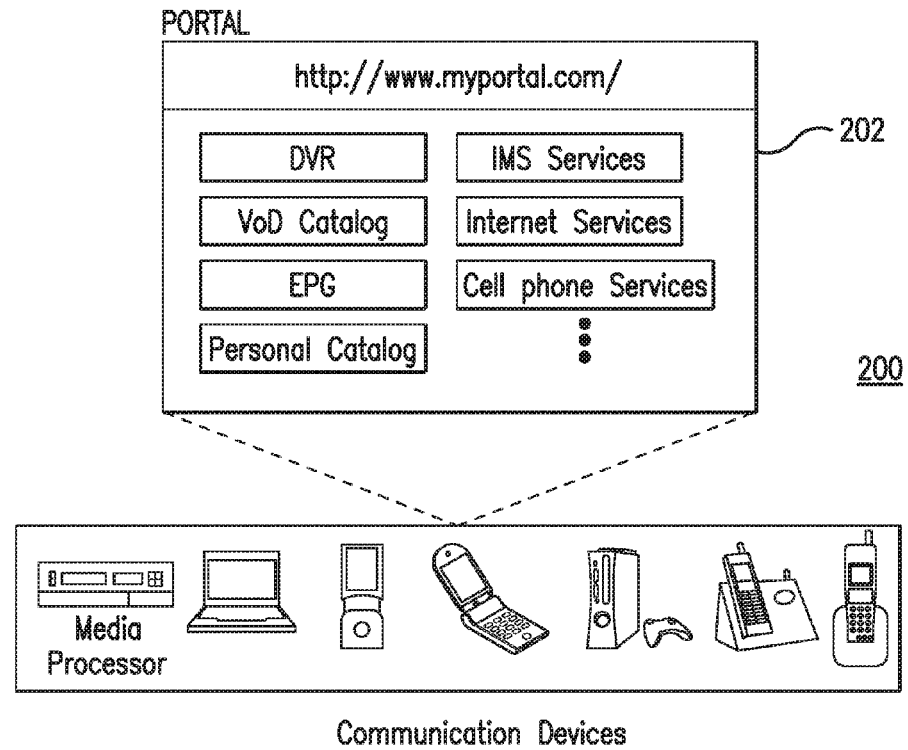
FIG. 2 depicts an illustrative embodiment of a portal interacting with the communication system of FIG. 1.

FIG. 2 depicts an illustrative embodiment of a portal 202 which can operate from the computing devices 130 described earlier of communication system 100 illustrated in FIG. 1. The portal 202 can be used for managing services of the communication system 100. The portal 202 can be accessed by a Uniform Resource Locator (URL) with a common Internet browser using an Internet-capable communication device such as those illustrated in FIG. 1. The portal 202 can be configured, for example, to access a media processor 106 and services managed thereby such as a Digital Video Recorder (DVR), a VoD catalog, an EPG, video gaming profile, a personal catalog (such as personal videos, pictures, audio recordings, etc.) stored in the media processor, provisioning IMS services, provisioning Internet services, provisioning cellular phone services, and so on.

Figure 3:
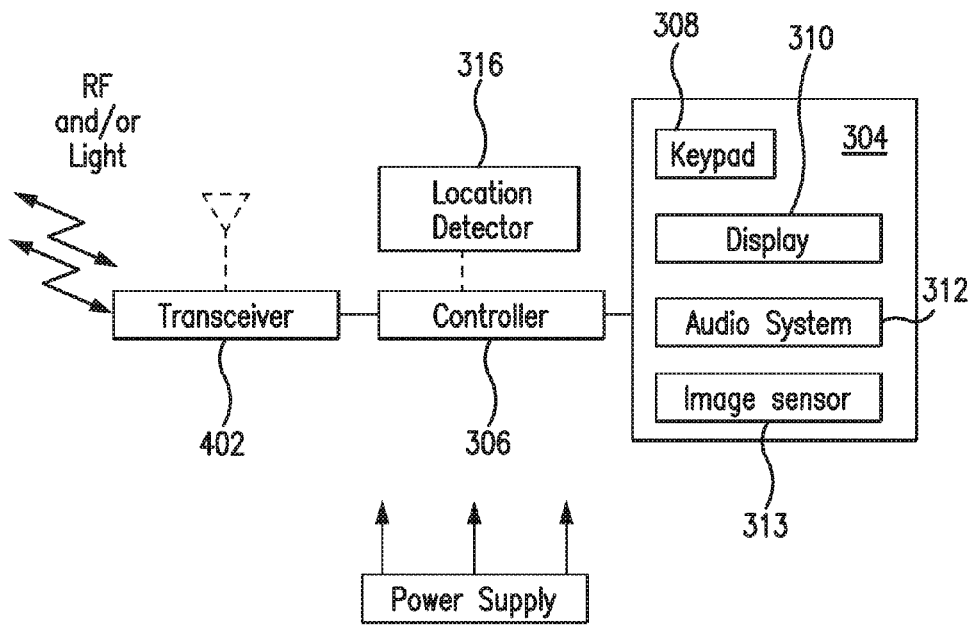
FIG. 3 depicts an illustrative embodiment of a communication device utilized in the communication system of FIG. 1.

FIG. 3 depicts an exemplary embodiment of a communication device 300. Communication device 300 can serve in whole or in part as an illustrative embodiment of the communication devices of FIG. 1 and other communication devices described herein. The communication device 300 can comprise a wireline and/or wireless transceiver 302 (herein transceiver 302), a user interface (UI) 304, a power supply 314, a location detector 316, and a controller 306 for managing operations thereof. The transceiver 302 can support short-range or long-range wireless access technologies such as infrared, Bluetooth, WiFi, Digital Enhanced Cordless Telecommunications (DECT), or cellular communication technologies, just to mention a few. Cellular technologies can include, for example, CDMA-1X, UMTS/HSDPA, GSM/GPRS, TDMA/EDGE, EV/DO, WiMAX, SDR, and next generation cellular wireless communication technologies as they arise. The transceiver 302 can also be adapted to support circuit-switched wireline access technologies (such as PSTN), packet-switched wireline access technologies (such as TCPIP, VoIP, etc.), and combinations thereof. The communication device 300 can be utilized for presenting the three-dimensional content that is generated using the perspective angle threshold and the plurality of two-dimensional images as described above.

The UI 304 can include a depressible or touch-sensitive keypad 308 with a navigation mechanism such as a roller ball, joystick, mouse, or navigation disk for manipulating operations of the communication device 300. The keypad 308 can be an integral part of a housing assembly of the communication device 300 or an independent device operably coupled thereto by a tethered wireline interface (such as a USB cable) or a wireless interface supporting for example Bluetooth. The keypad 308 can represent a numeric dialing keypad commonly used by phones, and/or a Qwerty keypad with alphanumeric keys. The UI 304 can further include a display 310 such as monochrome or color LCD (Liquid Crystal Display), OLED (Organic Light Emitting Diode) or other suitable display technology for conveying images to an end user of the communication device 300. In an embodiment where the display 310 is touch-sensitive, a portion or all of the keypad 308 can be presented by way of the display.

The UI 304 can also include an audio system 312 that utilizes common audio technology for conveying low volume audio (such as audio heard only in the proximity of a human ear) and high volume audio for hands free operation. The audio system 312 can further include a microphone for receiving audible signals of an end user. The audio system 312 can also be used for voice recognition applications. The UI 304 can further include an image sensor 313 such as a charged coupled device (CCD) camera for capturing still or moving images.

The power supply 314 can utilize common power management technologies such as replaceable and rechargeable batteries, supply regulation technologies, and charging system technologies for supplying energy to the components of the communication device 300 to facilitate long-range or short-range portable applications. The location detector 316 can utilize common location technology such as a global positioning system (GPS) receiver for identifying a location of the communication device 300 based on signals generated by a constellation of GPS satellites, thereby facilitating common location services such as navigation.

The communication device 300 can use the transceiver 302 to also determine a proximity to a cellular, WiFi or Bluetooth access point by common power sensing techniques such as utilizing a received signal strength indicator (RSSI) and/or a signal time of arrival (TOA) or time of flight (TOF). The controller 406 can utilize computing technologies such as a microprocessor, a digital signal processor (DSP), and/or a video processor with associated storage memory such a Flash, ROM, RAM, SRAM, DRAM or other storage technologies.

The communication device 300 can be adapted to perform the functions of the media processor 106, the media devices 108, or the portable communication devices 116 of FIG. 1, as well as IMS CDs and PSTN CDs. It will be appreciated that the communication device 300 can also represent other common devices that can operate in communication system 100 of FIG. 1 such as a gaming console and a media player.

Figure 4:
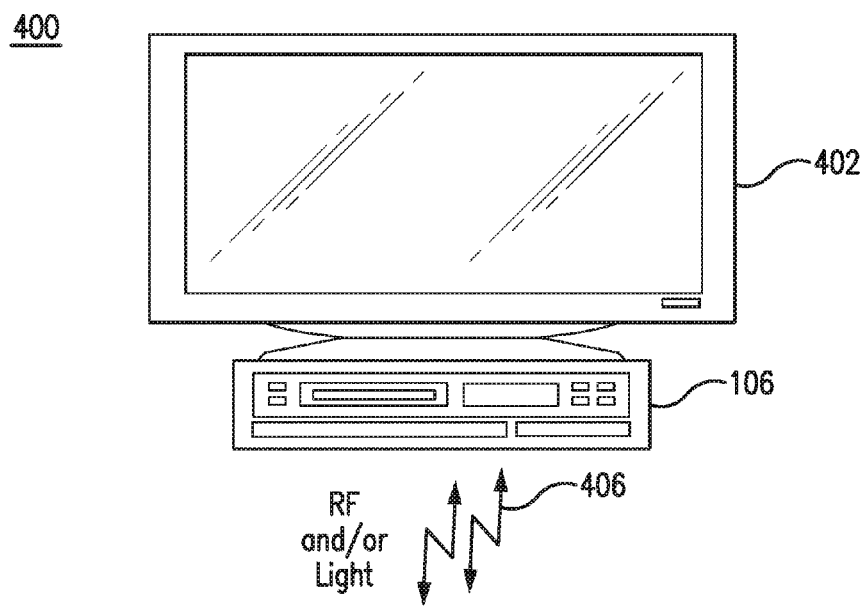
FIG. 4 depicts an illustrative embodiment of a presentation device and media processor for presenting media content.

FIG. 4 depicts an illustrative embodiment of a presentation device 402 and media processor 106 for presenting media content. In the present illustration, the presentation device 402 is depicted as a television set. It will be appreciated that the presentation device 402 alternatively can represent a portable communication device such as a cellular phone, a PDA, a computer, or other computing device with the ability to display media content. The media processor 106 can be an STB such as illustrated in FIG. 1, or some other computing device such as a cellular phone, computer, gaming console, or other device that can process and direct the presentation device 402 to emit images associated with media content. It is further noted that the media processor 106 and the presentation device 402 can be an integral unit. For example, a computer or cellular phone having computing and display resources collectively can represent the combination of a presentation device 402 and media processor 106. The presentation device 402 can be utilized for presenting the three-dimensional content that is generated using the perspective angle threshold and the plurality of two-dimensional images as described above.

Figure 5:
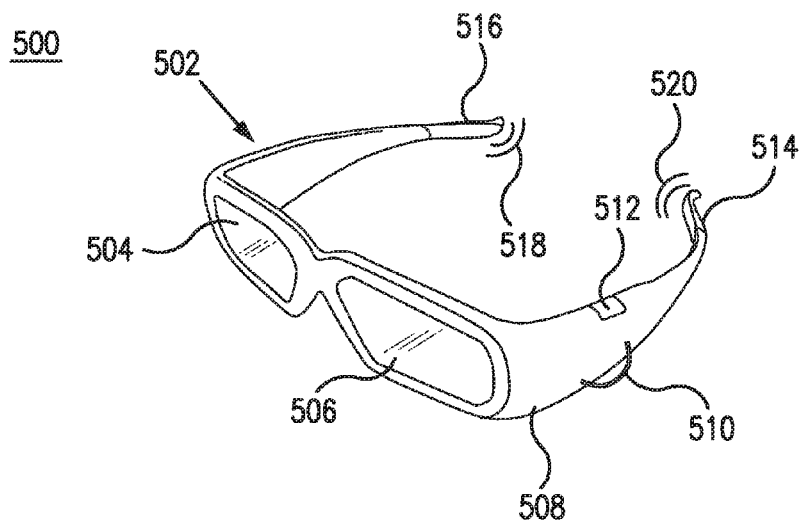
FIG. 5 depicts an illustrative embodiment of a viewing apparatus.

The media processor 106 can be adapted to communicate with accessories such as the viewing apparatus 502 of FIG. 5 by way of a wired or wireless interface. The communication can be one-way and/or two-way communication, such as providing the viewing apparatus 502 with a transceiver. A wired interface can represent a tethered connection from the viewing apparatus to an electro-mechanical port of the media processor 106 (e.g., USB or proprietary interface). A wireless interface can represent a radio frequency (RF) interface such as Bluetooth, WiFi, Zigbee or other wireless standard. The wireless interface can also represent an infrared communication interface. Any standard or proprietary wireless interface between the media processor 106 and the viewing apparatus 502 is contemplated by the presented disclosure.

The viewing apparatus 502 can represent an apparatus for viewing two-dimensional (2D) or three-dimensional (3D) stereoscopic images which can be still or moving images. The viewing apparatus 502 can be an active shutter viewing apparatus. In this embodiment, each lens has a liquid crystal layer which can be darkened or made to be transparent by the application of one or more bias voltages. Each lens 504, 506 can be independently controlled. Accordingly, the darkening of the lenses 504, 506 can alternate, or can be controlled to operate simultaneously.

Each viewing apparatus 502 can include all or portions of the components of the communication device 300 illustrated in FIG. 3. For example, the viewing apparatus 502 can utilize the receiver portion of the transceiver 302 in the form of an infrared receiver depicted by the window 508. Alternatively, the viewing apparatus 502 can function as a two-way communication device, in which case a full infrared transceiver could be utilize to exchange signals between the media processor 106 and the viewing apparatus 502.

The viewing apparatus 502 can utilize a controller 306 to control operations thereof, and a portable power supply (not shown). The viewing apparatus 502 can have portions of the UI 304 of FIG. 3. For example, the viewing apparatus 502 can have a multi-purpose button 512 which can function as a power on/off button and as a channel selection button. A power on/off feature can be implemented by a long-duration depression of button 512 which can toggle from an on state to an off state and vice-versa. Fast depressions of button 512 can be used for channel navigation. Alternatively, two buttons can be added to the viewing apparatus 502 for up/down channel selection, which operate independent of the on/off power button 512. In another embodiment, a thumbwheel can be used for scrolling between channels.

The viewing apparatus 502 can also include an audio system 312 with one or more speakers in the extensions of the housing assembly such as shown by references 516, 520 to produce localized audio 518, 520 near a user's ears. Different portions of the housing assembly can be used to produce mono, stereo, or surround sound effects. Ear cups (not shown) such as those used in headphones can be used by the viewing apparatus 502 (as an accessory or integral component) for a more direct and low-noise audio presentation technique. The volume of sound presented by the speakers 514, 516 can be controlled by a thumbwheel 510 (or up/down buttons—not shown).

It would be evident from the above descriptions that many embodiments of the viewing apparatus 502 are possible, all of which are contemplated by the present disclosure.

Figure 6:
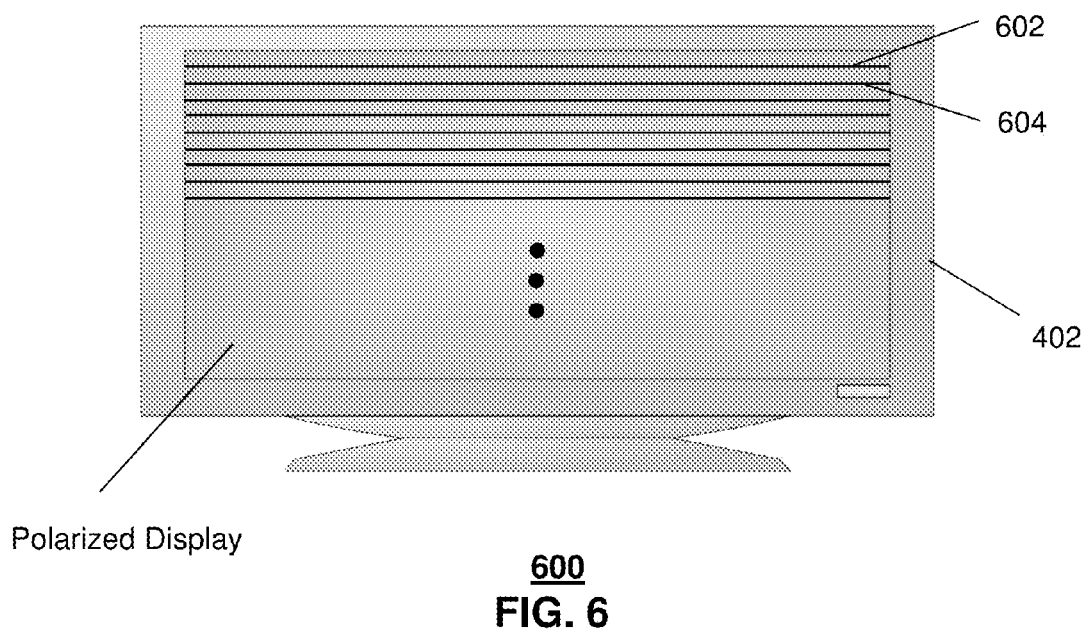
FIG. 6 depicts an illustrative embodiment of a presentation device with a polarized display.

FIG. 6 depicts an illustrative embodiment of the presentation device 402 of FIG. 4 with a polarized display. A display can be polarized with well-known polarization filter technology so that alternative horizontal pixel rows can be made to have differing polarizations. For instance, odd horizontal pixels 602 can be polarized for viewing with one polarization filter, while even horizontal pixels 604 can be polarized for viewing with an alternative polarization filter. The viewing apparatus 502 previously described can be adapted to have one lens polarized for odd pixel rows, while the other lens is polarized for viewing even pixel rows. With polarized lenses, the viewing apparatus 502 can present a user a 3D stereoscopic image.

Figure 7:
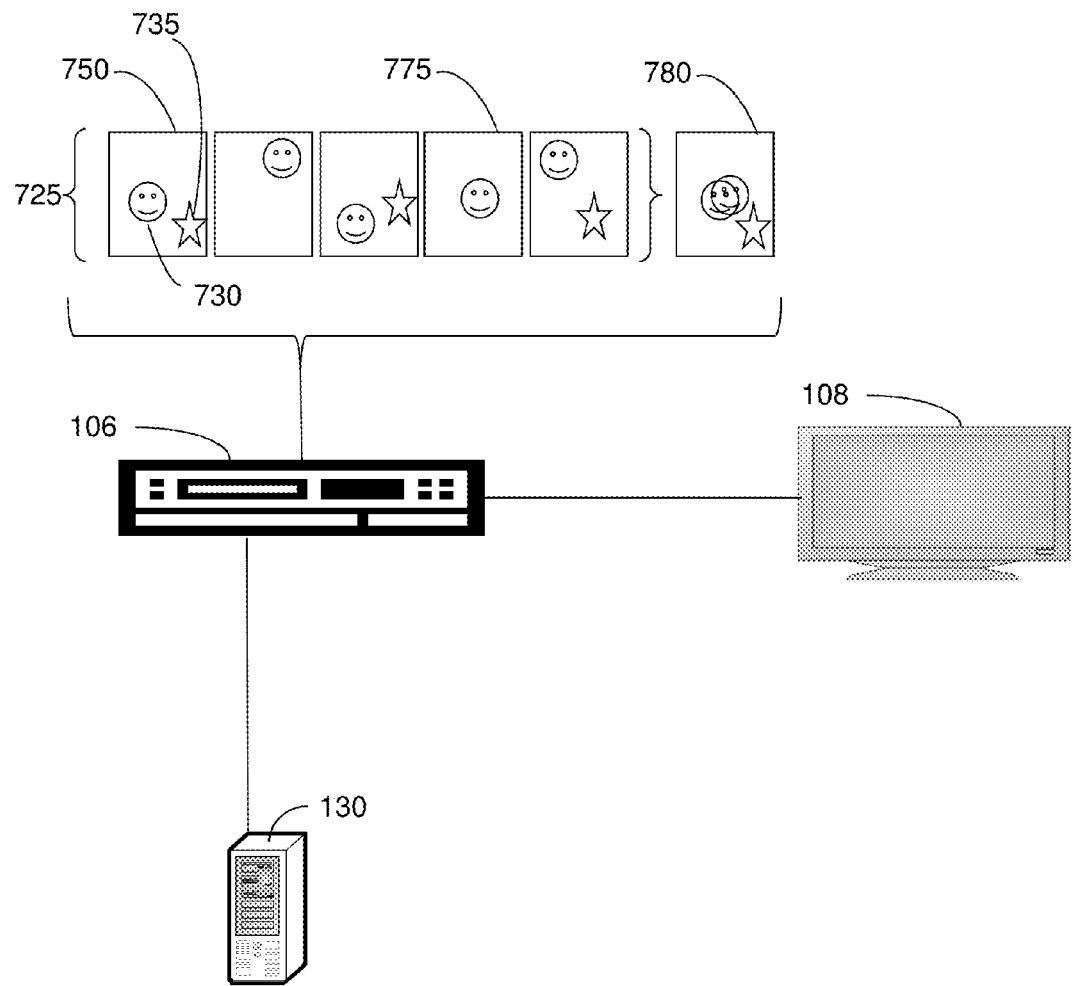

FIG. 7 depicts an illustrative embodiment of a communication system 700 for delivering media content. System 700 can include a computing device 130 for providing two-dimensional media content to a media processor 106, such as a set top box or gaming console. The devices 130 can deliver the media content through various methods including broadcast, multicast and/or unicast.

The media processor 106 can generate three-dimensional content using the two-dimensional content which comprises a plurality of images 725. For example, an object 730 can be identified in a first image 750 and can be identified in another or second image 775. If a difference in perspective between the first and second images 750, 775 satisfies a threshold for generating three-dimensional content then the first and second images 750, 775 can be used for generating three-dimensional content 780. For instance, the threshold can be based on a camera angle. The media processor 106 can analyze each of the other images that contain the identified object 730 until one of the images (e.g., the second image 775) has captured the object at a camera angle that falls within a range desired for generating three-dimensional content. The particular range can vary and can also be adjusted based on a number of factors, including user selection, display device parameters, type of media content (such as a sporting event vs. animation), and so forth. In one embodiment, the first image 750 and the second image 775 can be utilized for generating a third image that allows for three-dimensional viewing. As another example, the generated third image can be superimposed with one or more of the other images, such as the first image 750, to allow for the three-dimensional viewing where the first image is the left eye pair and the generated third image is the right eye pair.

In one embodiment, the media processor 106 can detect the capability of display devices and can adjust the three-dimensional media content, or the generation thereof, accordingly. For instance, a camera angle difference threshold can be adjusted based on a resolution of a display device so that the three-dimensional content has a better effect on the lower resolution display device.

The media processor 106 or other computing device can selectively add depth to objects in the images. For instance, first image 750 has a first object 730, as well as a second object 735. The generated three-dimensional content 780 can add depth to the object 730, while not adding depth to the object 735.

Figure 8:
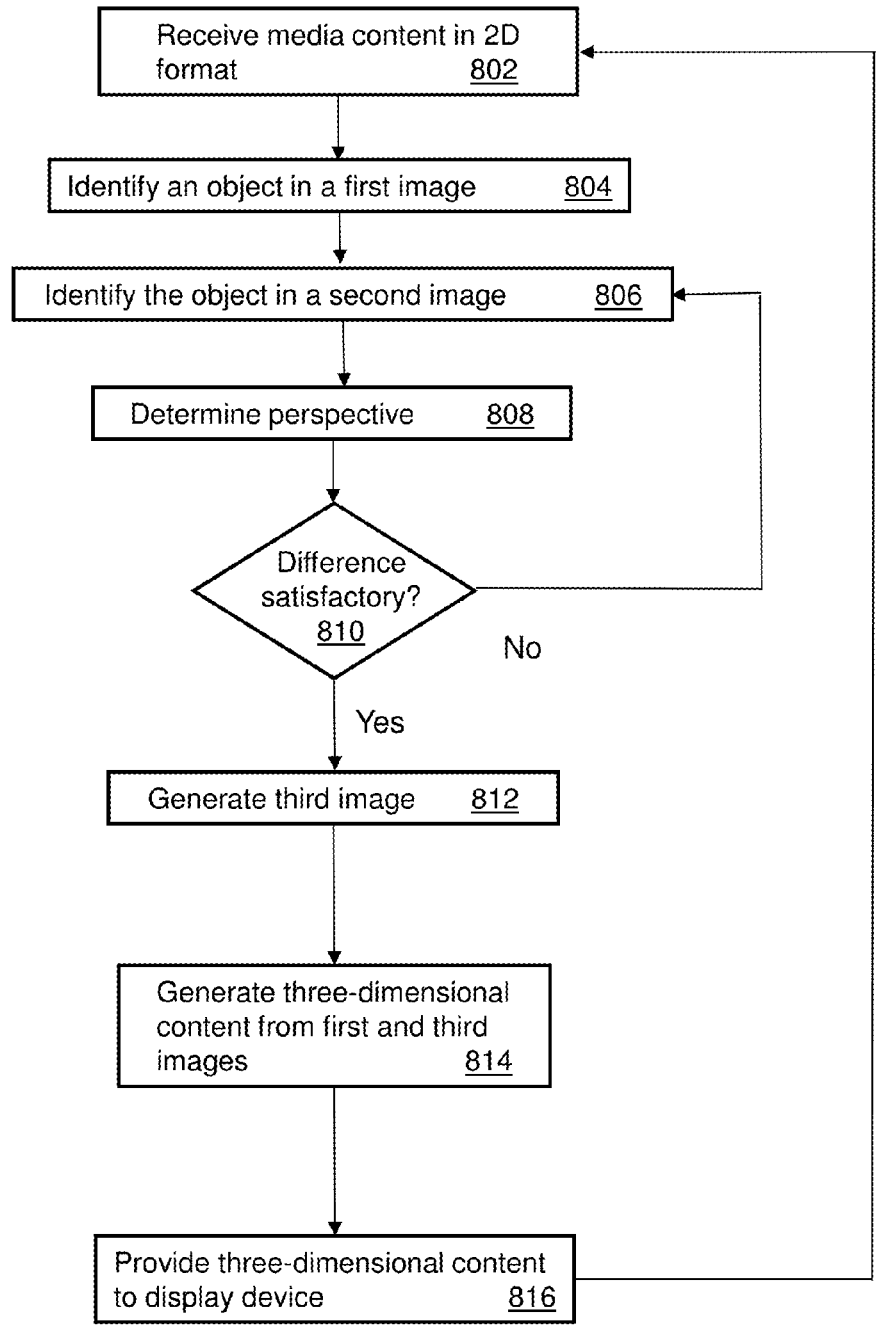
FIG. 8 depicts an illustrative embodiment of a method operating in portions of the devices and systems of FIGS. 1-7.

FIG. 8 depicts an illustrative embodiment of a method 800 operating in portions of the devices and systems described herein and/or illustrated in FIGS. 1-7. Method 800 can begin with step 802 in which media content in 2D format is received (or otherwise obtained) by the media processor. The media content can be of various types including still images, moving images and video games. In step 804, the media processor can identify an object depicted in the content. The object can be of various types, such as a main character in a movie or in animation, an individual in a still image, background features and so forth (e.g., the object 730 in FIG. 7). The particular methodology for identifying the object can vary.

In one embodiment, the identification of the object can be performed without user intervention based on image recognition techniques, such as recognizing people or recognizing moving objects. In one embodiment, the identification of the object can be based on other information associated with the media content, such as metadata transmitted with the content.

In another embodiment, a selection of objects to be identified can be based on user preferences, such as user inputted preferences or based on monitored behavior of a viewer. The selection is an indication of the objects or types of objects to which depth should be provided. As an example, a user may desire to see depth for athletes playing in a sporting event but may not desire to see depth for any of the other features shown during the sporting event. While the present disclosure can utilize other information for identifying the objects, the exemplary embodiments also contemplate the identification being performed without any user intervention.

In step 806, the media processor can search additional images of the media content for the identified object. The search and detection of the object can be performed using various techniques including image recognition. Once the object is identified in a second image then a perspective associated with the first and second images can be determined in step 808. For example, the camera angle used for capturing the object in the first and second images can be determined. The determination of perspective can be based on criteria other than the camera angle, including a position of the object in a shared coordinate system established for the two images, such as based on non-moving features shown in the images.

In step 810, if the difference in perspective between the first and second objects does not satisfy a threshold for generating three-dimensional content then the media processor can continue searching through the images. If on the other hand in step 810, the difference in perspective between the first and second objects satisfies a threshold for generating three-dimensional content then the media processor can generate the content using the first and second images. The particular threshold can vary and can be based on a number of factors. For example, where the perspective is being determined for a camera angle then the threshold can be based on an angular measurement that achieves the desired perspectives that both eyes of a viewer naturally receive in binocular vision.

In one embodiment, this threshold can be adjustable, such as by the media processor. For example, the adjustment of the threshold can be based on user preferences, such as in response to a presentation of options selected by a viewer. In another example, the adjustment to the threshold can be based on monitored behavior of the viewer. For instance, various thresholds can be presented to the viewer and the viewer's response (directly or indirectly such as through changing the channel) can be detected. In another example, the threshold can be based on the capability of a particular display device. For instance, the threshold can be adjusted based on a resolution of a television. As yet another example, the threshold can be adjusted based on the type of media content. For instance, it may be desirable to provide less depth to sporting events and more depth to animated videos.

In step 812, the three-dimensional media content can then be generated. For example referring back to FIG. 7, a third image 780 can be generated based on the object 730 that is identified in the first and second images 750, 775. The third image can be used with the first image for presenting the media content in three-dimensions as in step 814. In one embodiment, the first and third images can be used as alternating sequence pairs with the active shutter glasses 500 such that the lens 504 is used for viewing the first image and the lens 506 is used for viewing the third image. In another embodiment, the first and third images can be oppositely polarized and superimposed onto each other or shown in sequence such that a polarized viewing apparatus provides for three-dimensional viewing when the content is presented at a display device in step 816.

For moving images, method 800 can be repeated for each of the images, or a portion thereof, to provide for three-dimensional perspective throughout the presentation of the media content. In one embodiment where none of the other images satisfy the perspective threshold, then media processor can forego providing depth for that particular image or can use one or more of the previously generated third images. As an example, the media processor can utilize a combination of data from two or more of the generated third images (such as through averaging) to generate another third image that satisfies the perspective threshold. The media processor can use imaging techniques to replace particular images in the content with the generated third images to affect the three-dimensional perspective, while leaving other images in the content undisturbed, such as object 735 in FIG. 7.

In one embodiment, the media processor can generate image pairs using the third image, such as the two dimensional content image being the left pairing and the depth-adjusted image being the right pairing. The left and right pairings can then be sequentially presented at the display device and viewed utilizing active shutter glasses. In another embodiment, the left and right pairings can be generated as described above and then combined but oppositely polarized and viewed utilizing polarized glasses. The exemplary embodiments contemplate other techniques for generating the three-dimensional content from the two-dimensional content and the depth map.

The exemplary embodiments contemplate a viewing apparatus (such as active shutter glasses or passive polarization glasses) being detected through various means. The detection can be performed by the media processor, although other devices can also be utilized for this purpose as well. The detection can be based upon a number of thresholds, including recognizing that a viewer is wearing the viewing apparatus; detecting that the viewing apparatus is in a line of sight with a display device upon which the media content is or will be displayed; and determining that the viewing apparatus is within a pre-determined distance of the display device. The techniques and components utilized for detecting the viewing apparatus can vary. For example, the media processor can scan for the presence of the viewing apparatus. This can include two-way communication between the media processor and the viewing apparatus. In one embodiment, the viewing apparatus can emit a signal which is detected by the media processor. Presence and/or distance can be determined based on the signal, including utilizing signal strength. Location techniques can also be used for determining a position of the viewing apparatus, including triangulation and so forth.

Upon reviewing the aforementioned embodiments, it would be evident to an artisan with ordinary skill in the art that said embodiments can be modified, reduced, or enhanced without departing from the scope and spirit of the claims described below. The embodiments described above can be adapted to operate with any device capable of performing in whole or in part the steps described for method 800. For example, a cellular phone can be adapted to convert a broadcast of 2D image content to 3D image content using a received depth map.

In one embodiment, either or both of the searching for the object and the determination of the perspective can be facilitated based on the position of an image within the sequence of images. For example, an object appearing in image frames that are in proximity to each other may meet the perspective threshold where the camera and the object are moving at relatively slow speeds. In another embodiment, the type of camera shot can facilitate these determinations. For instance, in moving images, the type of camera shot can be instructive as to whether the perspective threshold may be met. If the camera shot is a moving shot of an object with limited movement then there may be a higher likelihood of meeting the perspective threshold than if the camera shot is a still shot of the object with limited movement. In one embodiment, image frames can be flagged or otherwise identified (such as through use of metadata) as to the type of camera shot. The media processor can then search those images with a desired camera shot to determine if they meet the threshold.

In another embodiment, the images can be flagged or otherwise identified, through use of metadata or another technique, with the particular objects shown so that the media processor does not need to detect the presence of the object. In one embodiment, the images or a portion thereof can have a coordinate system assigned to them to facilitate the determination of the perspective. The coordinate system can be included in metadata that accompanies the content and the object's position can be identified according to the coordinate system.

In another embodiment, the media content can be video games that are being transmitted to a gaming console in 2D format, such as from a backend server over the Internet. The gaming console can then convert the 2D images to 3D images for presentation on a display device, such as a television or a monitor. In one embodiment, the media processor can be a gateway connected with each of the STBs or connected directly with the display devices.

Other suitable modifications can be applied to the present disclosure without departing from the scope of the claims below. Accordingly, the reader is directed to the claims section for a fuller understanding of the breadth and scope of the present disclosure.

Figure 9:
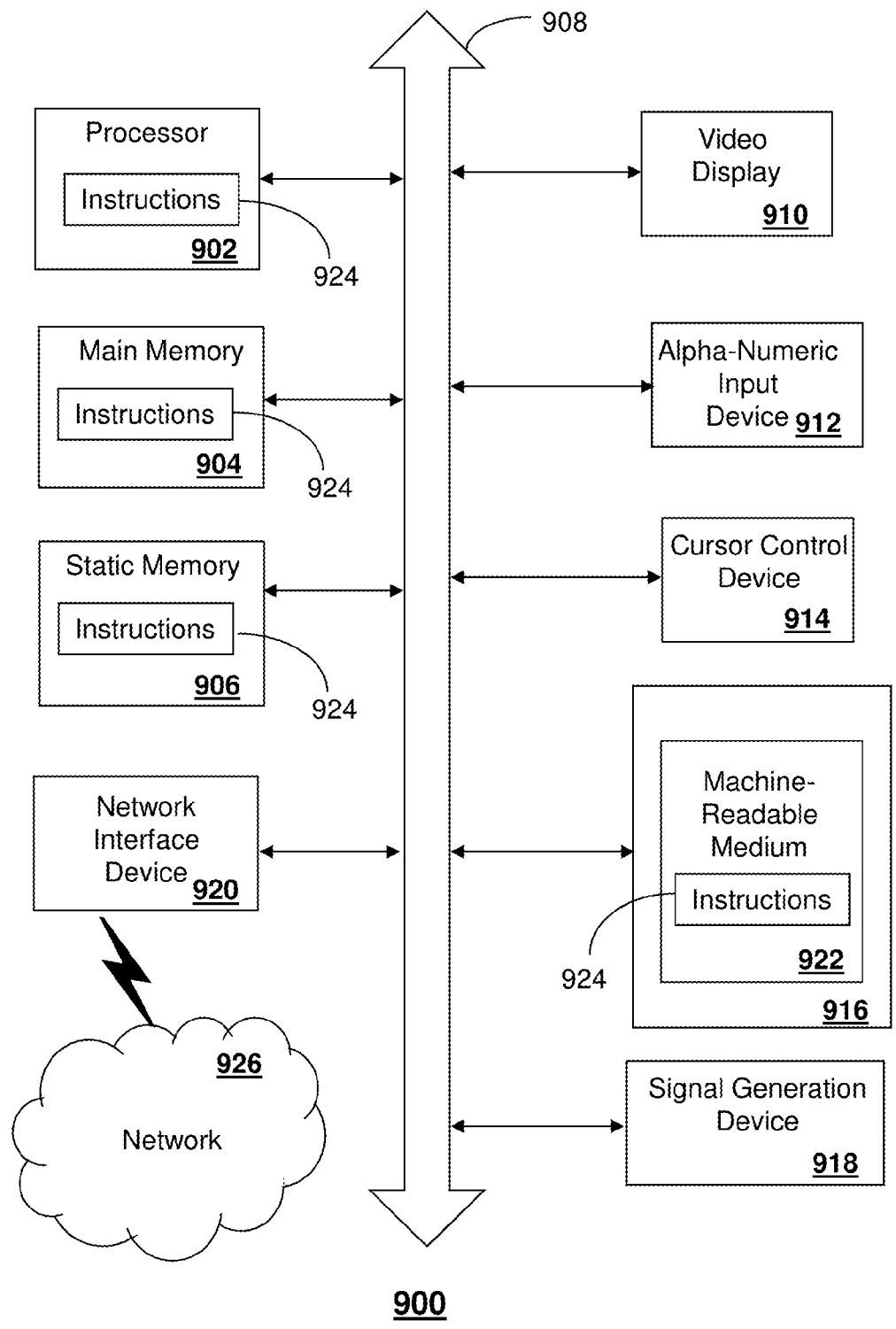
FIG. 9 is a diagrammatic representation of a machine in the form of a computer system within which a set of instructions, when executed, may cause the machine to perform any one or more of the methodologies discussed herein.

FIG. 9 depicts an exemplary diagrammatic representation of a machine in the form of a computer system 900 within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 900 may include a processor 902 (e.g., a central processing unit (CPU), a graphics processing unit (GPU, or both), a main memory 904 and a static memory 906, which communicate with each other via a bus 908. The computer system 900 may further include a video display unit 910 (e.g., a liquid crystal display (LCD), a flat panel, a solid state display, or a cathode ray tube (CRT)). The computer system 900 may include an input device 912 (e.g., a keyboard), a cursor control device 914 (e.g., a mouse), a disk drive unit 916, a signal generation device 918 (e.g., a speaker or remote control) and a network interface device 920.

The disk drive unit 916 may include a machine-readable medium 922 on which is stored one or more sets of instructions (e.g., software 924) embodying any one or more of the methodologies or functions described herein, including those methods illustrated above. The instructions 924 may also reside, completely or at least partially, within the main memory 904, the static memory 906, and/or within the processor 902 during execution thereof by the computer system 900. The main memory 904 and the processor 902 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 924, or that which receives and executes instructions 924 from a propagated signal so that a device connected to a network environment 926 can send or receive voice, video or data, and to communicate over the network 926 using the instructions 924. The instructions 924 may further be transmitted or received over a network 926 via the network interface device 920.

While the machine-readable medium 922 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure.

The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and/or a digital file attachment to e-mail or other self-contained information archive or set of archives is considered a distribution medium equivalent to a tangible storage medium. Accordingly, the disclosure is considered to include any one or more of a machine-readable medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:
1. A media processor, comprising:
   a controller; and
   a memory that stores executable instructions that, when executed by the controller, facilitate performance of operations, comprising:
      receiving, over a network, two-dimensional image content comprising a stream of moving images;
      receiving an identification of an item to be provided with depth as a selected item;
      searching for a plurality of objects in the stream of moving images using image recognition;

identifying the selected item of the plurality of objects in a first image of the stream of moving images as a first object;

identifying the first object in a second image of the stream of moving images using image recognition;

identifying a second object in the first image and the second image, wherein the second object comprises a non-moving feature of the first image and the second image;

determining a perspective angle difference between the first image and the second image based on a calculation of camera angles at which the first object has been captured in each of the first image and the second image based on a translational movement of the first object with respect to a second object in the first image and the second image;

generating a third image using the first image and the second image when the perspective angle difference satisfies a three-dimensional angle threshold;

generating three-dimensional image content using the first image and the third image based on the perspective angle difference; and providing the three-dimensional image content to a display device operably coupled with the media processor.

2. The media processor of claim 1, wherein the three-dimensional angle threshold is adjustable based on criteria that does not include a presentation parameter of the display device, wherein the criteria includes one of a user selected preference, monitored viewing behavior, a type of content, or combinations thereof.

3. The media processor of claim 1, wherein the three-dimensional angle threshold is adjusted based on a presentation parameter of the display device.

4. The media processor of claim 3, wherein the operations further comprise detecting the presentation parameter of the display device without user intervention.

5. The media processor of claim 1, wherein the operations further comprise detecting a viewing apparatus that is configured for viewing of the three-dimensional image content, wherein the controller presents an option for adjusting the three-dimensional image content, and wherein the three-dimensional angle threshold is adjusted based on a selection of the option.

6. The media processor of claim 1, wherein the two-dimensional image content is moving images, and wherein the controller is operable to identify the object from a character depicted in the moving images without user intervention, and wherein the two-dimensional image content is broadcast content.

7. The media processor of claim 1, wherein the operations further comprise generating the three-dimensional image content by using the first and third images in alternating-frame sequencing.

8. The media processor of claim 1, wherein the operations further comprise generating the three-dimensional image content by using the first and third images in polarization imaging.

9. The media processor of claim 1, wherein the operations further comprise accessing selection information provided based on user input, wherein the selection information indicates types of objects to be provided with depth, and wherein the identifying of the object in the first and second images is based on the types of objects.

10. The media processor of claim 1, wherein the operations further comprise superimposing the first and third images to generate the three-dimensional image content, wherein the first image comprises a first eye image and the third image comprises a second eye image of the three dimensional image content, and wherein the generating of the three-dimensional image content using the first image and the third image is performed without using any metadata provided with the two-dimensional image content.

11. A machine-readable storage device, comprising instructions, wherein responsive to executing the instructions, a processor performs operations comprising:

receiving over, a network, two-dimensional image content comprising a stream of moving images, wherein the two-dimensional image content is received from a single camera capturing video, and wherein the two-dimensional image content comprises a scene of related images containing a plurality of objects, wherein the plurality of objects comprise separate objects occurring in the related images;

receiving an identification of a first object to be provided with depth;

identifying the first object among the plurality of objects in a first image of the stream of moving images and in a second image of the stream of moving images;

determining that the first object undergoes a translational movement between the first and second images;

responsive to determining that the first object undergoes a translational movement between the first and second images:

identifying a second object of the plurality of objects, wherein the second object does not move in the first and second images;

determining a perspective angle difference between the first and second images based on a calculation of camera angles at which the object has been captured in each of the first and second images;

generating three-dimensional image content using the first and second images of the stream of moving images utilizing an image analysis of the object found in each of the first and second images when the perspective angle difference satisfies a three-dimensional angle threshold, wherein the three-dimensional image content is generated based on a comparison of the translational movement of the first object with respect to the second object;

adjusting a depth perspective of the three-dimensional image content as a depth adjusted image; and providing the three-dimensional image content having the depth adjusted image to a display device operably coupled with the processor.

12. The machine-readable storage device of claim 11, wherein the three-dimensional image content comprises the first image and a third image, wherein the third image comprises the depth adjusted image of the first object, wherein the operations further comprise superimposing the first and third images to generate the three-dimensional image content, and wherein the first image comprises a first eye image and the third image comprises a second eye image of the three dimensional image content.

13. The machine-readable storage device of claim 11, wherein the operations further comprise adjusting the depth perspective based on a presentation parameter of the display device; and detecting the presentation parameter of the display device without user intervention.

14. The machine-readable storage device of claim 11, wherein the operations further comprise:

presenting an option for adjusting the depth perspective; and adjusting the depth perspective based on a selection of the option.

15. The machine-readable storage device of claim 11, wherein the calculation of the camera angles is determined from the image analysis of the object in each of the first and second images, wherein the image analysis includes a comparison of the object with a non-moving feature in the first and second images.

16. The machine-readable storage device of claim 15, wherein the processor is one of a media processor or a gaming console and wherein the operations further comprise accessing selection information provided based on user input, wherein the selection information indicates types of objects to be provided with depth, and wherein the identifying of the object in the first and second images is based on the types of objects.

17. The machine-readable storage device of claim 15, wherein the operations comprise determining the perspective difference based on a type of camera shot.

18. A method, comprising:

receiving, over a network by a processor, two-dimensional image content comprising a stream of moving images, wherein the two-dimensional image content comprises a scene of related images containing a plurality of objects;

receiving, by the processor, a selection of an object to which a depth adjustment is to be applied as a selected object;

identifying, by the processor, the selected object as a first object of the plurality of objects found in a first image of the stream of moving images and a second image of the stream of moving images, wherein the first object undergoes a translational movement;

responsive to identifying the first object:

identifying, by the processor, a second object in the first image and the second image, wherein the second object does not move between the first image and the second image;

determining, by the processor, a perspective difference between the first object and the second object based on a calculation of camera angles at which the object has been captured in each of the first and second images, wherein the calculation of the camera angles is determined from an image analysis of the first object in each of the first and second images, wherein the image analysis comprises a comparison of the translational movement of the first object with respect to the second object in the first image and the second image;

generating three-dimensional image content using the first and second images when the perspective difference satisfies a three-dimensional perspective threshold based on the perspective difference; and providing the three-dimensional image content to a display device.

19. The method of claim 18, wherein the identifying the selected object comprises selecting a type of objects to which depth is to be added as the selected object.

20. The method of claim 18, wherein the three-dimensional image content comprises the first image and a third image, wherein the third image comprises the depth adjusted image of the first object, wherein the method further comprises superimposing the first and third images to generate the three-dimensional image content, wherein the first image comprises a first eye image and the third image comprises a second eye image of the three dimensional image content.

* * * * *